May 15, 1956

R. E. MOORE ET AL 2,745,500

PROPELLER CONTROL FOR CONTROLLING BLADE
PITCH IN GOVERNED SPEED, FEATHERING
AND NEGATIVE PITCH REGIMES

Filed Feb. 28, 1952

INVENTORS
Richard E. Moore
BY Dale W. Miller

Willete, Hardman and Fehr
THEIR ATTORNEYS

INVENTORS
Richard E. Moore
BY Dale W. Miller

Willits, Hardman and Lehr
THEIR ATTORNEYS

INVENTORS
Richard E. Moore
BY Dale W. Miller

THEIR ATTORNEYS

United States Patent Office 2,745,500
Patented May 15, 1956

2,745,500

PROPELLER CONTROL FOR CONTROLLING BLADE PITCH IN GOVERNED SPEED, FEATHERING, AND NEGATIVE PITCH REGIMES

Richard E. Moore, Dayton, and Dale W. Miller, Brookville, Ohio, assignors to General Motors Corporation, Detroit, Mich., a corporation of Delaware Application February 28, 1952, Serial No. 273,806

21 Claims. (Cl. 170—160.21)

The present invention relates to the control of propeller operation on aircraft or the like and particularly to a system for controlling blade pitch in the governed speed, feathering and negative pitch regimes.

One of our objects is to provide a fluid pressure system for controlling the movements of a variable pitch propeller blade with accuracy and alacrity. We accomplish this object by providing a fluid pressure system with a source of regulated high pressure fluid and a source of low pressure fluid. The low pressure fluid is utilized to control the movements of a distributor valve that directs the high pressure fluid to opposite sides of a reversible blade shifting motor. Specifically, the low pressure fluid is supplied to a speed sensitive valve and to a selector valve assembly. Manual control means are provided for positioning the speed sensitive valve to determine the governed speed of a rotating propeller blade. Manual means are also provided for selectively actuating elements of the selector valve assembly for determining blade movements to the feathering and negative pitch regimes.

An accumulator is charged with fluid from the high pressure source, and a valve mechanism for selectively connecting the accumulator into the fluid system is coincidentally actuated by the manual means which moves the selector valve elements when it is desired to operate in the feathering and negative pitch regimes. Moreover, when the blade is moved to the negative pitch regime, means are provided for conditioning the speed sensitive valve to provide a rapid return of the blade to the speed governing regime.

The low pressure fluid source is connected by means of the speed sensitive valve and the selector assembly to a servo-actuating mechanism for the distributor valve. The various movements of the propeller blade are controlled by the application of the low pressure fluid to the servo-actuating mechanism of the distributor valve as determined by the positions of the speed sensitive valve or the elements of the selector valve assembly.

A pressure regulating means for the high pressure source provides the necessary source pressure for increasing the pitch of a propeller blade which is subject to aerodynamic and centrifugal forces tending to move the blade to a decrease pitch position. The increase pitch line is further provided with a constant leak valve means which enables precise governing to be effected by the increase pitch port of the distributor valve. However, when blade movements towards a decrease pitch position are desired, the pressure regulating valve assembly may provide a relief port for reducing the pressure applied to the blade shifting motor. The accumulator pressure is made available to the system when the controls are actuated to the feathering or negative pitch regimes, but means are provided so that the accumulator will not be connected into the fluid system unless the pressure in the system is less than the pressure in the accumulator.

Further objects and advantages of the present invention will be apparent from the following description, reference being had to the accompanying drawings in which similar reference numerals denote similar parts in the several views.

In the drawings:

Fig. 9 is a cross sectional view along line 9—9 of Fig. 8.

Figure 1:
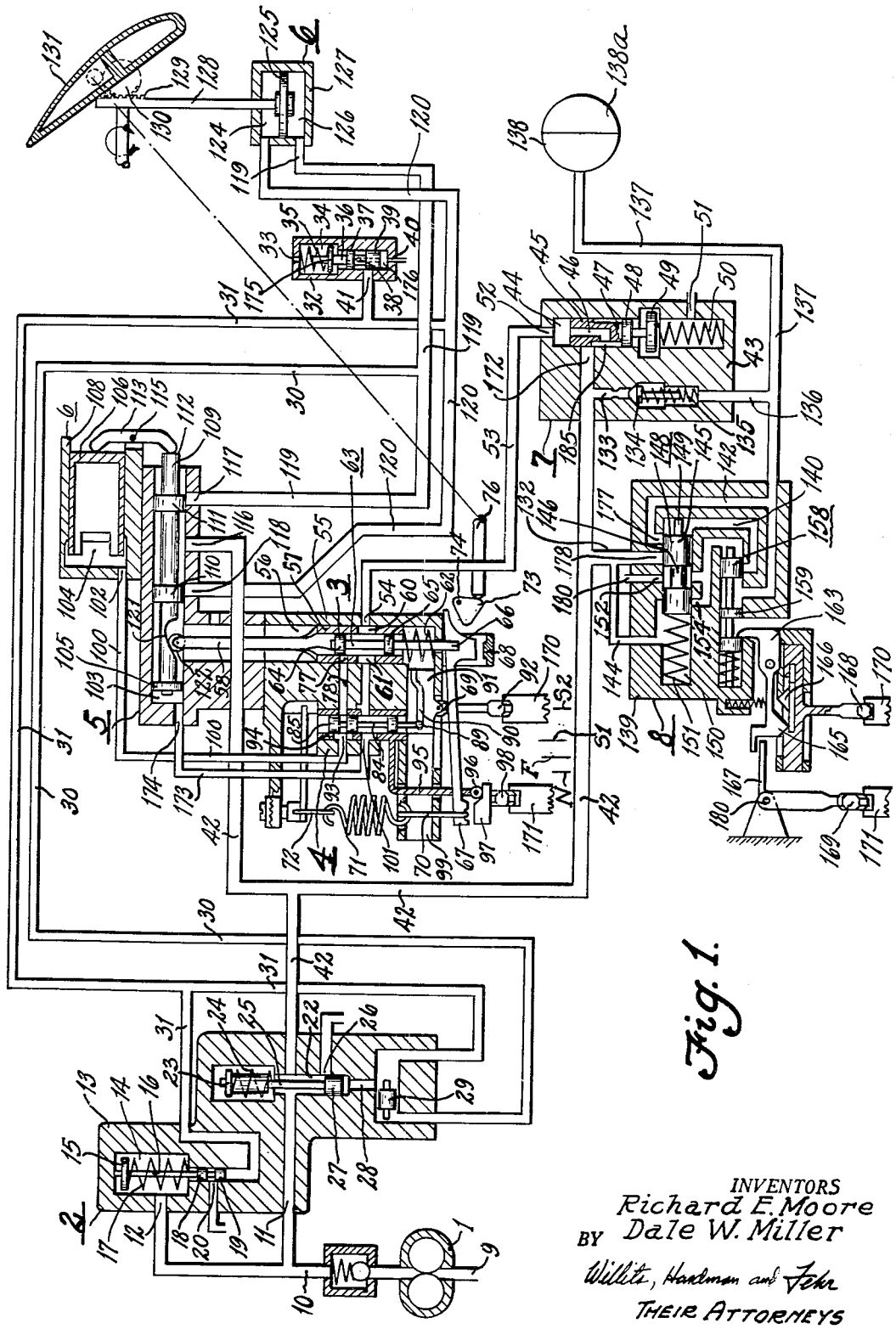
Fig. 1 is a fluid circuit connecting the elements of the control system.

Referring more particularly to Fig. 1 of the drawings, the fluid circuit embodies a pump 1 which supplies fluid under pressure to a pressure control valve assembly or pressure regulating means designated generally by 2. Regulated fluid pressure from the control valve assembly 2 is supplied to a distributor valve 5 and to a pressure reducing valve 7, which supplies a reduced fluid pressure to a speed sensitive valve 3 and a selector valve assembly 4. The distributor valve 5 directs high-pressure fluid to a fluid motor 6 that moves a blade 131 of a variable pitch propeller. The variable pitch propeller is of the type disclosed in the patents to Blanchard et al. 2,307,101 and 2,307,102, granted on January 5, 1943, in which the fluid circuit is modified by this disclosure. High-pressure fluid is also supplied to feathering control valve assembly 8. The pump 1, which is in the form of a gear type pump, has an inlet 9 and an outlet line 10 which supplies fluid pressure through passages 11 and 12 to component parts of the pressure regulating means 2. Passage 12 communicates with a chamber 14 in housing 13, in which is mounted a plunger 16 having a valving land 18 and a a piston 19 (constituting a relief valve). A spring 17 positioned between a member 15 and an inner wall of housing 13 normally urges the plunger to a position where land 18 closes a relief port 20. The plunger 16, under the urge of centrifugal force, the load of spring 17 and fluid pressure acting on the lower surface of piston 19, tends to maintain the port 20 in a closed position. The fluid pressure is supplied from the distributor valve 5, through line 31, when it is positioned so as to direct fluid pressure to the motor 6 in a pitch increasing direction. The plunger 16 tends to open relief port 20 under the urge of fluid pressure from the pump 1 acting on the upper surface of land 18. The various parts are so constructed and arranged such that there will be no fluid exhausted when the distributor valve 5 directs fluid to the motor 6 in an increasing pitch direction. However, when the distributor valve 5 directs fluid to the motor 6 in such a manner as to decrease the pitch of the propeller blade, fluid pressure from the distributor valve is not supplied through line 31 to the lower surface of piston 19. Hence, relief port 20 may be opened under the urge of the fluid pressure supplied by the pump to thereby limit the maximum pressure available for blade movements in the decreasing pitch direction.

Pressure fluid from the pump 1 is also supplied to an equal area valve of the pressure regulating means 2, through passage 11 in the housing 13. The equal area valve is housed in a chamber 22 and includes a plunger 25 having a damping member 23 at one end and a piston 27 at the other end. A spring 24, positioned between the damping member 23 and an inner surface of the housing 13, and centrifugal force normally tend to maintain the piston 27 in a position such that it closes an exhaust port 26. Fluid pressure from the pump 1 acts on the upper surface of the piston 27 and normally urges the piston to a position where it will open exhaust port 26 to provide a pressure relief for the fluid circuit. However, the spring 24, centrifugal force and fluid pressure supplied to the lower surface of piston 27 from the distributor valve 5 whenever pitch changing movements are desired, oppose the pump fluid pressure tending to open the exhaust port 26. The total surface area of piston 27 exposed to the pump pressure is equal to the total surface area of piston 27 that is exposed to the pressure in lines 30 or 31. Fluid pressure from the distributor valve 5 is supplied through lines 30 and 31 to opposite sides of a shuttle valve 29, which is movable in opposite directions to connect either lines 30 or 31, whichever is at the greater pressure, to a passage 28 which connects with chamber 22 and the piston 27 of the equal area valve. Whenever the distributor valve is positioned to direct fluid to the motor 6 in either the increasing or decreasing pitch directions, fluid will also be supplied to the equal area valve from the line which is at the greater pressure. Thus the pump 1 will operate at a pressure equal to the pressure in either lines 30 or 31 plus the pressure equivalent to the load of spring 24 and centrifugal force, so that the pressure in the fluid circuit fills the requirements of the motor 6 necessary to carry out its control function.

The pump fluid pressure, as regulated by the pressure regulating means 2, is supplied to a high pressure trunk line 42 which is connected to a supply port 116 of the distributor valve 5, a supply line 132 of the feathering control valve assembly 8, and to port 172 of pressure reducing valve 7. Pressure reducing valve 7 is contained in a housing 43 having a chamber 44. Within chamber 44 is mounted a plunger 47 having spaced lands 45 and 48 in fluid tight engagement with the surface of chamber 44. A stop member 49 of the plunger is urged outwardly, as viewed in the drawing, by means of a spring 50. Plunger 47 is provided with a longitudinally extending passage 46 which is open to the groove 185 between lands 45 and 48. Fluid under high pressure from line 42 passes through port 172 which is restricted by land 45 to reduce the pressure of the fluid passing through passage 46 and outlet port 52 into a low pressure line 53. Fluid which escapes around the edges of land 48 may be exhausted through a port 51 in the housing 43.

Figure 2:
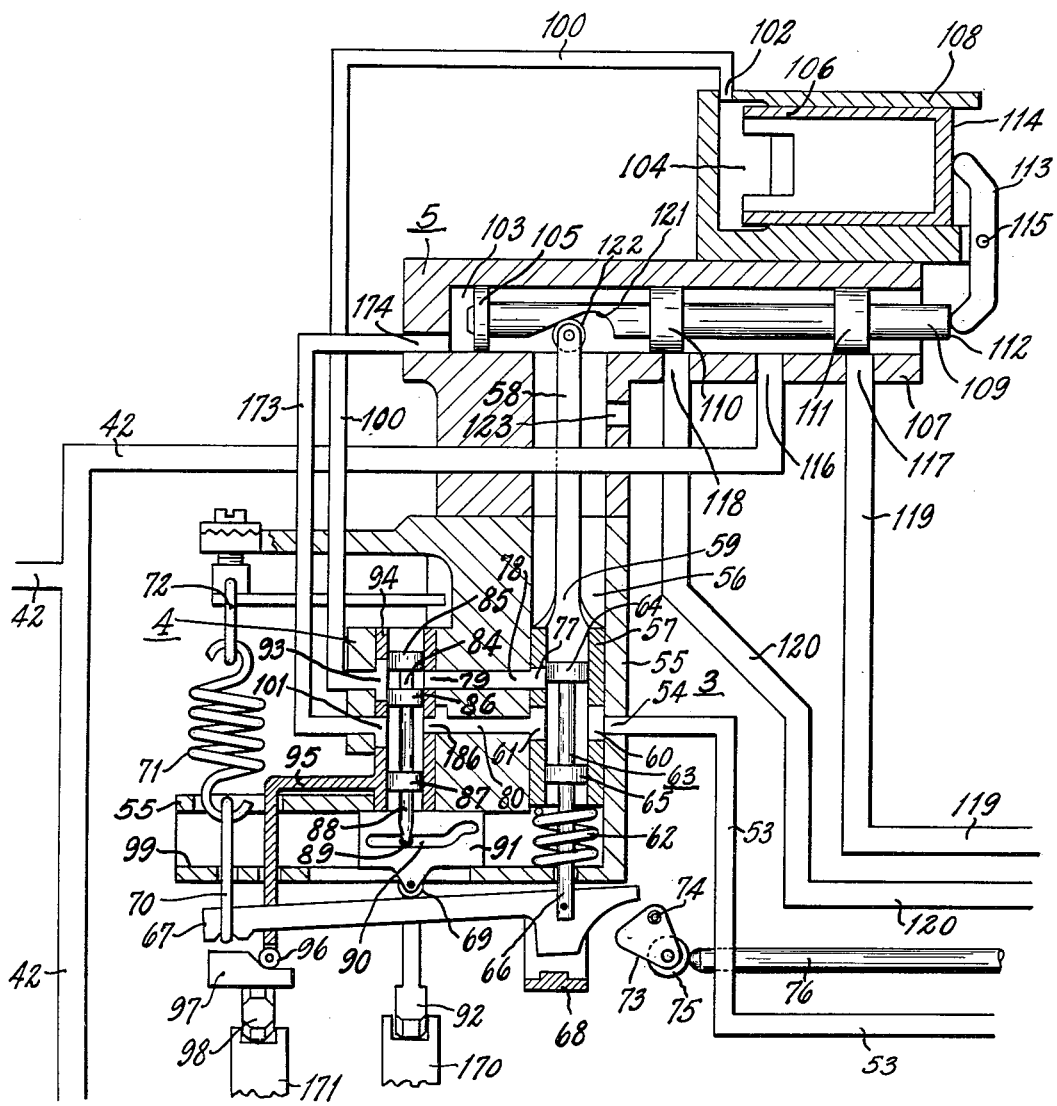
Fig. 2 is an enlarged fragmentary detail showing the positions of the various valves in the governed positive regime.

Referring more particularly to Fig. 2 of the drawings, low pressure fluid from line 53 is supplied to port 54 of the speed sensitive valve 3. Port 54 in housing 55 of the speed sensitive valve is in constant communication with a port 60 of a sleeve 57 mounted within chamber 56 of the housing 55. Low pressure fluid is constantly supplied from line 53 through ports 54 and 60 to a second port 61 of the sleeve 57. The speed sensitive valve 3 also includes a plunger 63 having spaced lands 64 and 65 that is pivotally connected to a lever 67 by means of extension 66. Land 64 of plunger 63 controls the flow of low pressure fluid through a third port 77 of the sleeve 57. The land 64 and port 77 are so arranged that the flow of low pressure fluid therethrough into passage 78 will be metered during operation in the governed speed regime. Lever 67 has associated therewith a movable fulcrum 69 about which the plunger 63 of the speed sensitive valve tends to move the lever under the urge of centrifugal force, as opposed by spring 71 attached to a stationary member 72 at one end and to the lever 67 by means of 70 at the other end. The speed of propeller operation in the governed positive range may be varied by movements of the fulcrum 69 which is attached to a shoe 92 that rides in movable control ring 170. The end of lever 67, to which plunger 63 is attached by means of 66, is adapted to be engaged by a cam 73. Cam 73 moves about pivot 74 under the urge of rod 76 which is coupled by a suitable mechanical linkage to the propeller blade 131. Rod 76 engages a follower 75 that moves the cam 73 about its axis so as to position the plunger 63 in a position so as to admit low pressure fluid to large servo chamber 104 that actuates the distributor valve to direct fluid to the increase pitch chamber of the motor 6. Cam 73 is moved to this position when propeller blade is moved into negative pitch regime so that the plunger is moved upwardly to condition the fluid circuit for obtaining a rapid return to the governed speed regime when it is selected. Cam 73 is also moved to this position when a predetermined low blade angle has been reached by the blades and thereby establishes a low pitch stop for the blades in the governed speed regime. A stop 68 limits the movement of the lever 67 and its associated plunger 63 in the downward direction, when cam 73 is withdrawn.

The selector valve assembly 4 includes a sleeve valve 94 and a plunger valve 84. The plunger valve 84 is provided with spaced lands 85, 86 and 87 and an extension 88 which is attached to a cam follower 89 that rides in a cam slot 90 of a member 91. Member 91 is movably mounted in a slot 99 of the housing 55 and connected to movable fulcrum 69. The sleeve valve 94 which surrounds the plunger valve is provided with ports 79, 186, 93 and 101, and is connected by an arm 95 to a cam follower 96 which is adapted to ride on the surface of cam 97 attached to shoe 98 that rides in reciprocable control ring 171. Port 93 is connected by means of line 100 to a port 102 of servo chamber 104, and port 101 is connected by line 173 to port 174 of servo chamber 103.

Low pressure fluid, metered through port 77 of the speed sensitive valve 3, passes through passage 78, ports 79 and 93 into line 100. Low pressure fluid is constantly supplied to ports 186 and 101 of the selector valve assembly through passage 80 from port 61 of the speed sensitive valve 3. Thus, low pressure fluid from line 53 is constantly supplied to line 173 and servo chamber 103 from port 101. This low pressure fluid in servo chamber 103 acts on servo piston 105 and tends to move the distributor valve 5 to the right, as viewed in the drawings. However, this movement of the distributor valve may, or may not, be opposed by the fluid in servo chamber 104 acting on piston 106 mounted in cylinder 108. Piston 106 is of larger area than piston 105 and this piston, under the urge of fluid pressure in chamber 104, tends to move the distributor valve to the left, as viewed in the drawings, by means of rocker arm 113 pivoted at 115 acting on surface 112 of distributor rod 109 and engaging surface 114 of the piston 106.

The distributor valve 5 is housed in a casing 107 and includes a rod 109 having spaced lands 110 and 111 that cooperate with ports 118 and 117, respectively. The rod 109 is provided with a cam surface 121 in which a cam follower 122 connected by means of 58 to one end of the sleeve 57 of the speed sensitive valve 3 is adapted to ride. The cam follower 122 is maintained in contact with cam surface 121 by means of spring 62 mounted between the other end of the sleeve 57 and an inner surface of the housing 55. High pressure fluid is supplied to the waist between lands 110 and 111 through port 116. Movements of the distributor valve in opposite directions, under the urge of fluid pressure in the servo chambers calling for pitch changes in the governed positive range, will be transmitted by means of cam follower 122 and its associated parts to the sleeve 57 of the speed sensitive valve 3 so as to cause the sleeve to follow up the movements of the distributor valve. The end of the sleeve 57, attached to the cam follow-up mechanism, is provided with an opening 59 through which fluid may drain from servo chamber 104 through port 123, when the speed sensitive valve responds to an underspeed condition. Under these conditions servo chamber 103 is supplied with fluid under pressure from line 53 through port 54, port 61, passage 80, port 136, port 101 and line 173, while servo chamber 104 is connected to drain through passage 100, port 93, port 79, passage 78, port 77, opening 59 and port 123. When the speed sensitive valve responds to overspeed condition, fluid from servo chamber 103 is forced back into line 53 by reason of the larger area of piston 106 in servo chamber 104. Under these conditions servo chamber 104 is supplied with fluid under pressure from line 53 through port 54, port 77, passage 78, port 79, port 93 and line 100, while fluid from chamber 103 is forced through line 173, port 101, port 186, passage 80, and ports 61 and 54 to the line 53.

Referring, again, to Fig. 1 of the drawings, lines 119 and 120, connected to distributor valve control parts 117 and 118, respectively, are connected to opposite sides of a piston 125 of the fluid motor 6. Piston 125 is housed in a casing 127 and divides this casing into an increase pitch chamber 124 and a decrease pitch chamber 126. The piston 125 has attached thereto a rod 128 which is provided with a rack 129 that engages a gear 130 to effect pitch changing movements of the blade 131. The increase pitch line 120 and decrease pitch line 119, respectively, communicate with fluid lines 31 and 30 which direct fluid to opposite sides of the shuttle valve 29. In addition, fluid line 31 communicates with a port 41 of a constant leak valve. The constant leak valve embodies a casing 32 having a chamber 34 in which is mounted a plunger 36 having spaced lands 37 and 39. The casing 32 is provided with an exhaust port 33. A spring 35, mounted between an inner surface of the casing 32 and an annular disc 175, tends to urge the plunger 36 to a position wherein land 39 will open port 41. Plunger 36 is also provided with a longitudinally extending passage 38 connecting the waist between lands 37 and 39 to a chamber 176. Chamber 176 is provided with an orifice 40 through which a constant flow of increase pitch fluid is allowed to flow. Pressure fluid from line 31 passes through port 41 and through passage 38 into chamber 176. The pressure in chamber 176 and centrifugal force tend to move the plunger to a position where land 39 will close port 41, the pressure maintained in chamber 176 being equal to the load of spring 35 minus centrifugal force.

The opposing forces tending to move the plunger 36 maintain a constant leak of increase pitch pressure fluid to drain through orifice 40. The quantity of fluid is sufficient so that all precise governing of propeller speed is effected by flow from the increase pitch port 118 of the distributor valve. In this manner close tolerances between the ports and lands of the distributor valve 5 can be eliminated. Thus, the blade will be maintained at a position enabling the propeller to be rotated at a constant speed.

High pressure fluid in line 42 is also used to charge an accumulator 138, or pressure storing means. The accumulator is charged by fluid passing through port 133 and check valve 134, urged against a seat by means of a spring 135, through lines 136 and 137 whenever the pressure of fluid in line 42 exceeds the pressure of that in the accumulator 138. Line 137 communicates with the accumulator 138 at one end, and communicates with feathering control valve assembly 8 at the other end. High pressure fluid line 42 also communicates with the feathering control valve assembly by means of line 132. Chamber 138a of the accumulator is charged with a nitrogen preload by any suitable means.

The feathering control valve assembly includes a pressure responsive valve 148 and a pilot valve 158. The pressure responsive valve 148 includes a plunger 146 having spaced lands 145 and 147 mounted in a chamber 150 of housing 139. Line 132 communicates with passage 144 which leads to one end of chamber 150, and exposes one end surface of land 145 to the fluid pressure in line 42. Plunger 146 is urged to the right, as viewed in the drawings, under the urge of pressure from line 42 and the force of spring 151 acting on the end surface of land 147, to a position where stop member 149 engages an inner wall of housing 139. Chamber 150 is provided with spaced ports 152, 153, 154, 177 and 178. Port 152 communicates with the waist between lands 145 and 147 when the plunger 146 is in the position shown in Fig. 1 of the drawing. The port 152 also communicates with a passage 180 which is open to drain. Ports 153 and 154 communicate with chamber 143 of the pilot valve 158. Ports 154, 177 and 178 are closed, and ports 152 and 153 are open when the plunger 146 is in the position shown in Fig. 1. Port 178 communicates with pressure line 132 and port 177 communicates with passage 142 in the housing 139.

The pilot valve 158 includes a plunger 155 having spaced lands 156 and 159 which are separated by a waist 141. The plunger 155 is provided at one end with an extension 157 which limits the movements of the pilot valve under the urge of a spring 161. The spring 161 is mounted in chamber 162 between an inner surface of this chamber and one end of a piston 160. The other end of piston 160 is adapted to be engaged by a latch 181 which forms one end of the bell-crank 163 that is pivoted at 164. A cam 165, located adjacent the other end of bell-crank 163, is adapted to be moved so as to pivot the bell-crank and unlatch the piston 160 against the force of spring 179, to allow movement of the pilot valve 158 under the urge of spring 161. Chamber 162 is provided with a pair of ports 182 and 183. Port 182 communicates with the waist 141 between the lands of the pilot valve and also with line 137 connected with the accumulator 138. Port 183 communicates by means of passage 140 to a chamber 184 of the pressure responsive valve 148.

A cam 166 slidably supported in a slot 168a of a shoe 168, that rides in control ring 170, is used to trip the bell-crank that unlatches the pilot valve when operation in the feathering regime is selected. A lug 167, pivoted at 180 and having one end attached to a shoe 169 that rides in control ring 171, is adapted to trip the bell-crank and unlatch the pilot valve when operation in the negative pitch regime is selected.

The operation and function of the various elements will be described in connection with Figs. 2 to 6 under different operating conditions. Fig. 2 of the drawings shows the positions of the various valves during onspeed operation in the governed positive regime. Under these conditions, low pressure fluid is continuously metered through passage 77 of the speed sensitive valve 3 through passage 78, ports 79 and 93, line 100 and port 102 to large servo chamber 104. Under these conditions, the low pressure fluid in chamber 104 will act on the surface of piston 106 through the rocker arm 113 so as to move the distributor valve rod 109 to force fluid from smaller servo chamber 103 through port 174, line 173, ports 101 and 186, passage 80, port 61 into the annular channel between lands 64 and 65 of the speed sensitive valve 3. Under these conditions, land 110 will partially open port 118 to the high pressure fluid supplied through port 116. Thus, high pressure fluid will be supplied through increase pitch line 120 to the increase pitch chamber of the fluid motor in sufficient quantities to just balance the tendency of the blade to move to a decrease pitch position under the urge of centrifugal and aerodynamic forces acting on the blade. The fluid flow required for this balanced condition is controlled by the flow through orifice 40 of the constant leak valve.

Figure 3:
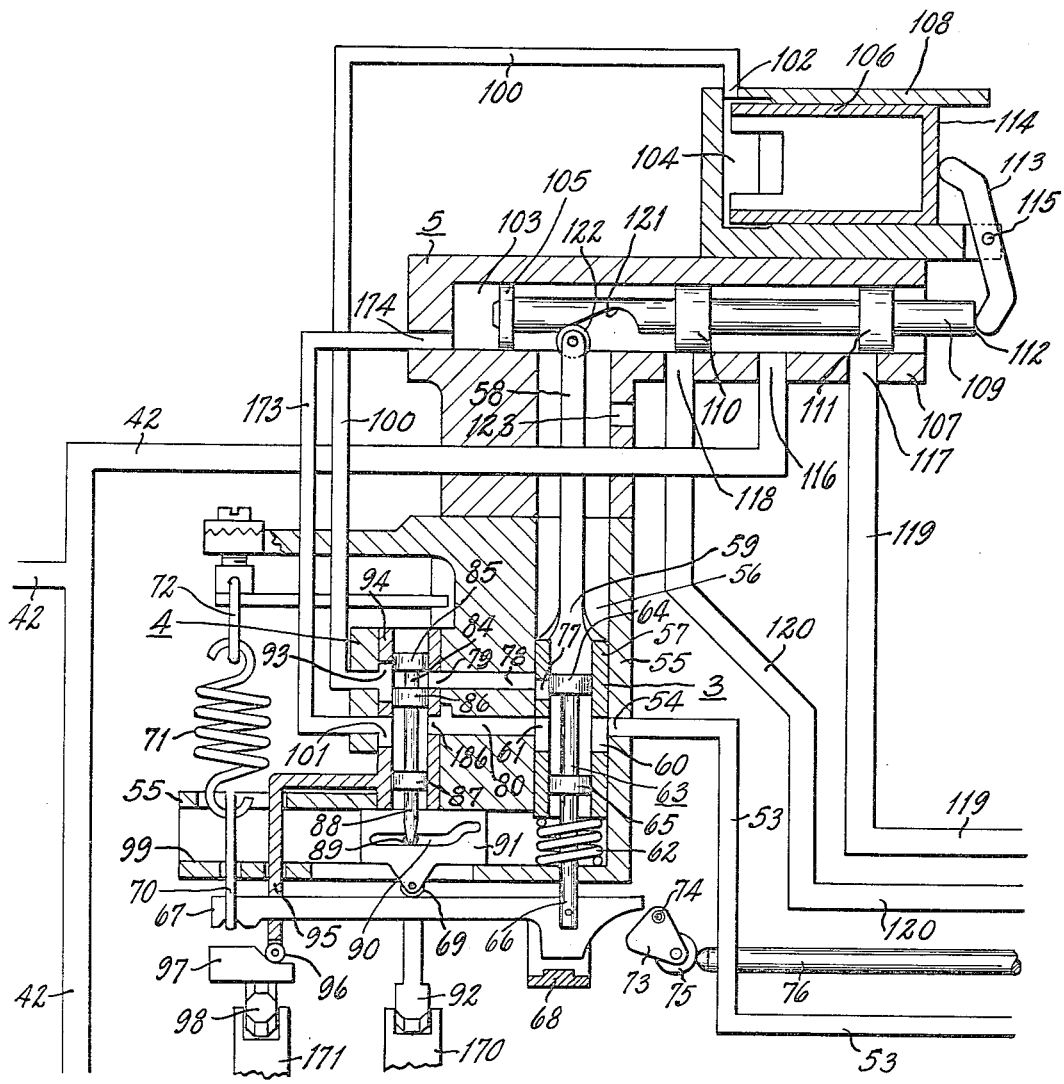
Fig. 3 is an enlarged fragmentary detail showing the positions of the various valves in underspeed condition.

The positions of the various valves during underspeed conditions in the governed positive regime are shown in Fig. 3. Under these conditions, the land 64 of the plunger 63 will place port 77 in communication with chamber 59 and port 123 to drain. The low pressure fluid from line 53 that is constantly supplied to the small servo chamber 103 through ports 54, 60, 61, passage 80, ports 186 and 101, line 173 and port 174 will, thus, move the distributor valve 5 to a position where port 117 will be in communication with the high pressure supplied through port 116. Low pressure fluid in large servo chamber 104 will be forced through port 102, line 100, ports 93 and 79, passage 78, and port 77 into chamber 59 from whence it may pass through port 123 to drain. However, movement of the distributor valve will be transmitted to sleeve 57 of the speed sensitive valve by means of cam 121 and follower 122, so as to restrict the drain back from servo chamber 104 through port 77, and limit the movement of the distributor valve. Under these conditions, high pressure fluid will be supplied to the decrease pitch chamber 126 of the fluid motor 6 so as to move the blade to a decrease pitch position and correct the underspeed condition.

When high pressure fluid is supplied through port 117 and line 119 to the decrease pitch chamber of the blade shifting motor, the increase pitch chamber is exposed to drain through line 120, ports 118 and 123.

Referring to Fig. 1, the fluid pressure, supplied to the decrease pitch chamber of the fluid motor 6, will also be supplied to the lower surface of piston 27 in the equal area valve by means of line 30 and passage 28. However, no fluid pressure will be supplied to the lower surface of piston 19 in the relief valve. Hence, the pressure supplied to the system will be limited to a pressure equivalent to the load of spring 17 and centrifugal force acting on plunger 16. Any higher pump pressure will effect a downward movement of plunger 16 so as to allow land 18 to open relief port 20 so as to reduce the system pressure. The equal area valve will further regulate the pressure supplied to high pressure line 42 to the pressure acting on the lower surface of piston 27 plus a pressure equivalent to the load of spring 24 and centrifugal force acting on the plunger 25. The magnitude of the pressure supplied to line 42, as determined by the magnitude of the underspeed condition, is always sufficient to meet the requirements of the fluid motor 6. After the underspeed condition has been corrected so that the speed is again that of the selected speed, the plunger 63 will move upwardly under the urge of centrifugal force to the position shown in Fig. 2 and onspeed operation in the governed positive regime will commence.

Figure 4:
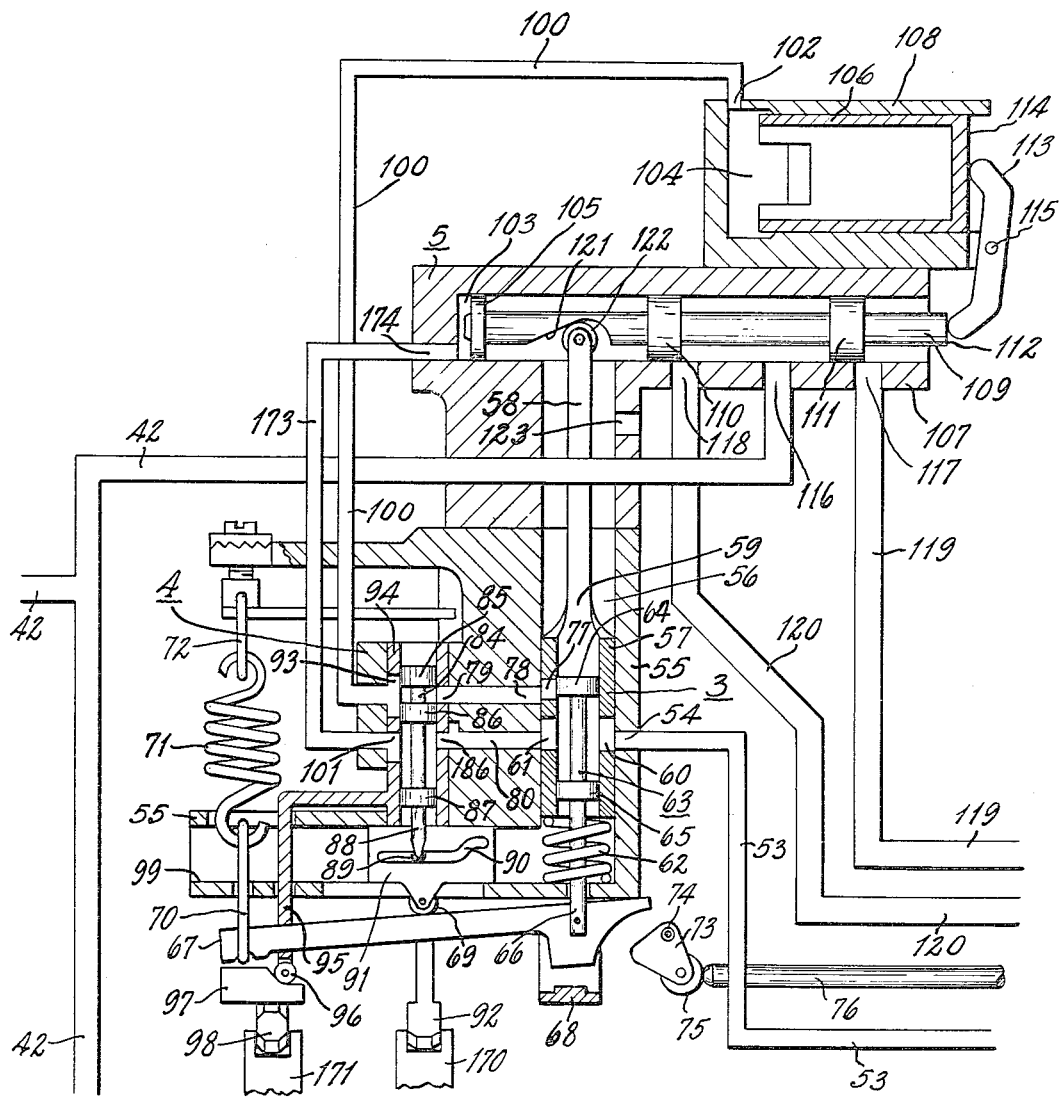
Fig. 4 is an enlarged fragmentary detail showing the positions of the various valves in overspeed condition.

The positions of the various valves when an overspeed condition exists during operation in the governed positive regime, is shown in Fig. 4. Under the conditions, the plunger 63 will be urged upwardly, as viewed in the drawings, due to the action of centrifugal force so that land 64 will open port 77 wider than under governed onspeed conditions as previously described. Under these conditions, the low pressure fluid from line 53 passing through ports 54 and 60 will be metered to a lesser degree than it is in an onspeed condition. Thus a greater fluid pressure will be supplied to large servo chamber 104 which will move distributor valve 103 to open port 118 wider. The movement of the distributor valve will again be limited by the follow-up action of sleeve 57 to restrict the amount of fluid supplied to servo chamber 104 through port 77. Thus, high pressure fluid from port 116 will be supplied in sufficient quantities so as to overcome the tendency of the blades to shift to the decrease pitch position and further to move the blades to an increased pitch position so as to reduce the speed of the propeller. When high pressure fluid is being supplied through port 118 and line 120 to the increase pitch chamber 124 of the blade changing motor, the decrease pitch chamber 126 is exposed to drain through line 119 and port 117 of the distributor valve.

Referring to Fig. 1, the fluid pressure supplied to the increase pitch chamber of the fluid motor 6 will also be supplied to the lower surface of piston 27 in the equal area valve, and to the lower surface of piston 19 in the relief valve by means of line 31. This pressure acting on the lower surface of piston 19 in the relief valve plus load of spring 17 and centrifugal force acting on the plunger 16, is sufficient to maintain the plunger in a position where pump pressure acting on the upper surface of land 18 will be unable to move the plunger downwardly. Hence, the pressure supplied to high pressure line 42 will be regulated by the equal area valve to the pressure acting on the lower surface of piston 27 plus a pressure equivalent to the load of spring 24 and centrifugal force acting on plunger 25. The magnitude of pressure supplied to line 42 is again determined by the magnitude of the pressure in line 30, but since relief port 20 is unable to limit the system pressure, the motor 6 may be subjected to the maximum pump pressure if it is required. After the speed of the propeller has been reduced to the selected speed setting, the plunger will move downwardly into the position for onspeed operation in the governed positive regime.

Figure 5:
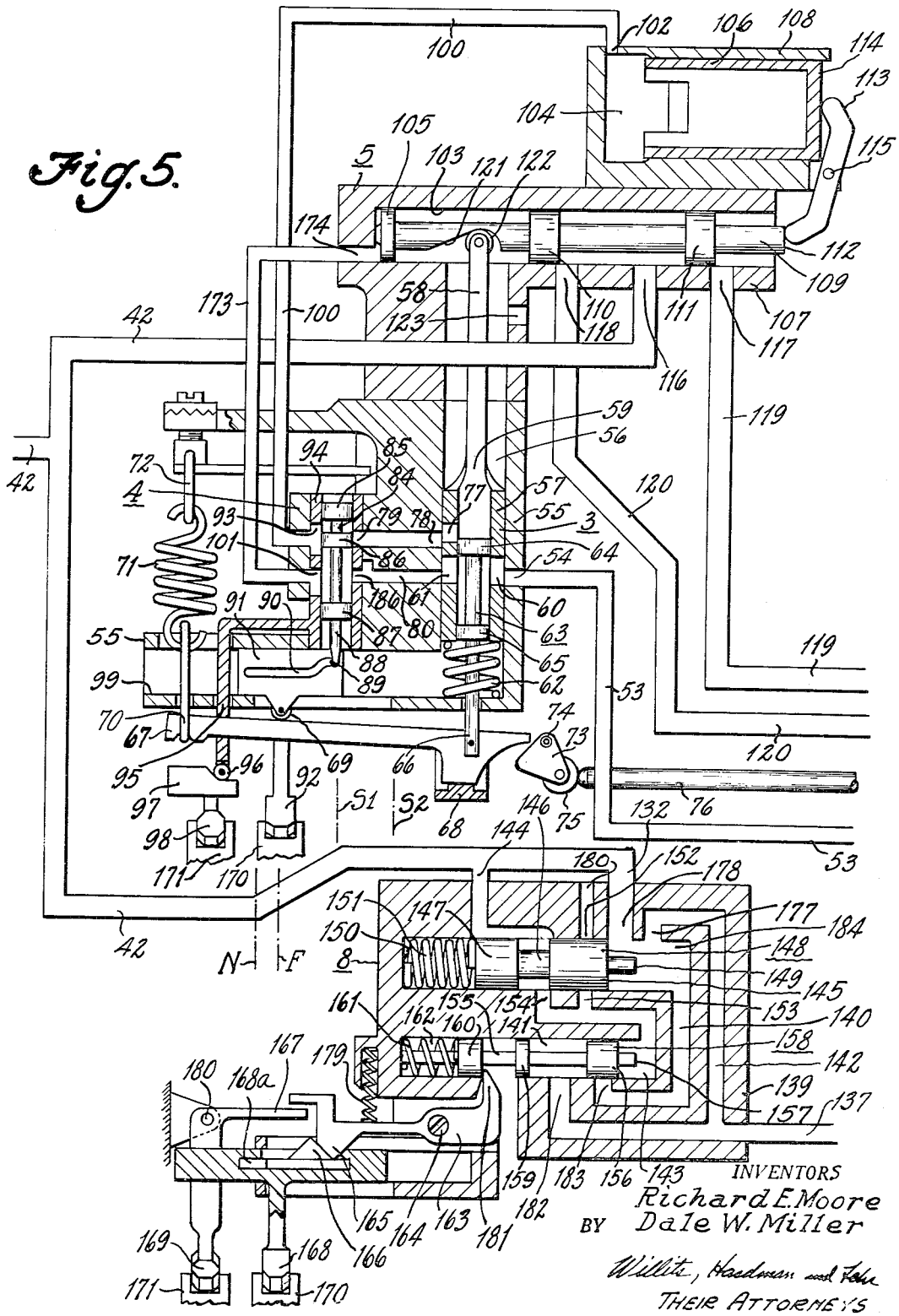
Fig. 5 is an enlarged fragmentary detail showing positions of the various valves in the feathered regime of operation.

The positions of the various control elements when operation in the feathered regime is selected, is shown in Fig. 5. The control ring 170 is moved to the left to the position marked F, and member 91 is also moved to the left the same distance. When member 91 is moved to the left, the plunger 84, attached by means 83 to the cam follower 89, is shifted upwardly so that port 93 is in communication with port 186. Under these conditions, low pressure fluid will be constantly supplied to large servo chamber 104 without any metering action by the speed sensitive valve 3 and the distributor valve 5 will be moved to a position wherein control port 118 is wide open. Thus, any operational effect of the speed sensitive valve is nullified. All the fluid in small servo chamber 103 will be forced back through the selector valve assembly 4 into the low pressure line 53. Coincident with movement of the member 91 to its extreme left position, control ring 170 will also move shoe 168 and its associated sliding cam 166 so as to engage cam 165 and pivot bell-crank 163 so as to unlatch the piston 160 of the pilot valve 158. When the piston 160 of the pilot valve is unlatched, the plunger 155 will move to the right and expose port 183 to the accumulator pressure supplied to port 182. The accumulator pressure will be communicated by means of passage 140 to chamber 184 of the pressure responsive valve 148. If the accumulator pressure is sufficient to overcome the force of fluid pressure from line 42 acting on the end of land 147 and the force of spring 151, the pressure responsive valve 148 will move to the left and expose port 178 to port 177 which is connected by passage 142 to the accumulator. Thus, if the pressure in line 42 plus the force of spring 151 is less than the pressure in accumulator 138, the fluid pressure in accumulator 138 will be applied to line 132 and line 42 to pressure port 116 of the distributor valve 5. However, if the pressure in line 42 plus the force of spring 151 is greater than the pressure in accumulator 138, the flow responsive valve 148 will not move to the left and the accumulator pressure will not be connected to fluid line 42 through line 132. When the pressure responsive valve 148 does move to the left, as shown in Fig. 5, pressure fluid from line 132 will flow through passage 144 and port 154 into chamber 143 of the pilot valve 158 so as to move the pilot valve to the left where latch 181 will again engage the piston 160. Once the pressure responsive valve 148 has been moved to the left, it will remain in this position until the blade movement has been completed, since accumulator pressure in passage 142 may pass through port 177 to maintain the valve 148 in the extreme left position. When the pressure responsive valve 148 is moved to its extreme left position, drain port 152 will be closed. Under these conditions, high pressure fluid will be supplied to the increase pitch chamber of the blade motor 6 through ports 116 and 118 of the distributor valve 5 so as to move the blade to the feathered position. When the blade 131 has been moved to the feathered position, fluid pressure in chambers 184 and 150 will be equal and hence the load of spring 151 will move valve 148 to the position shown in Fig. 1 of the drawings. In that position, port 152 will be open to allow the fluid in chamber 143 to flow to drain, through ports 153, 152 and passage 180, and accumulator 138 and line 42 will be disconnected.

Figure 6:
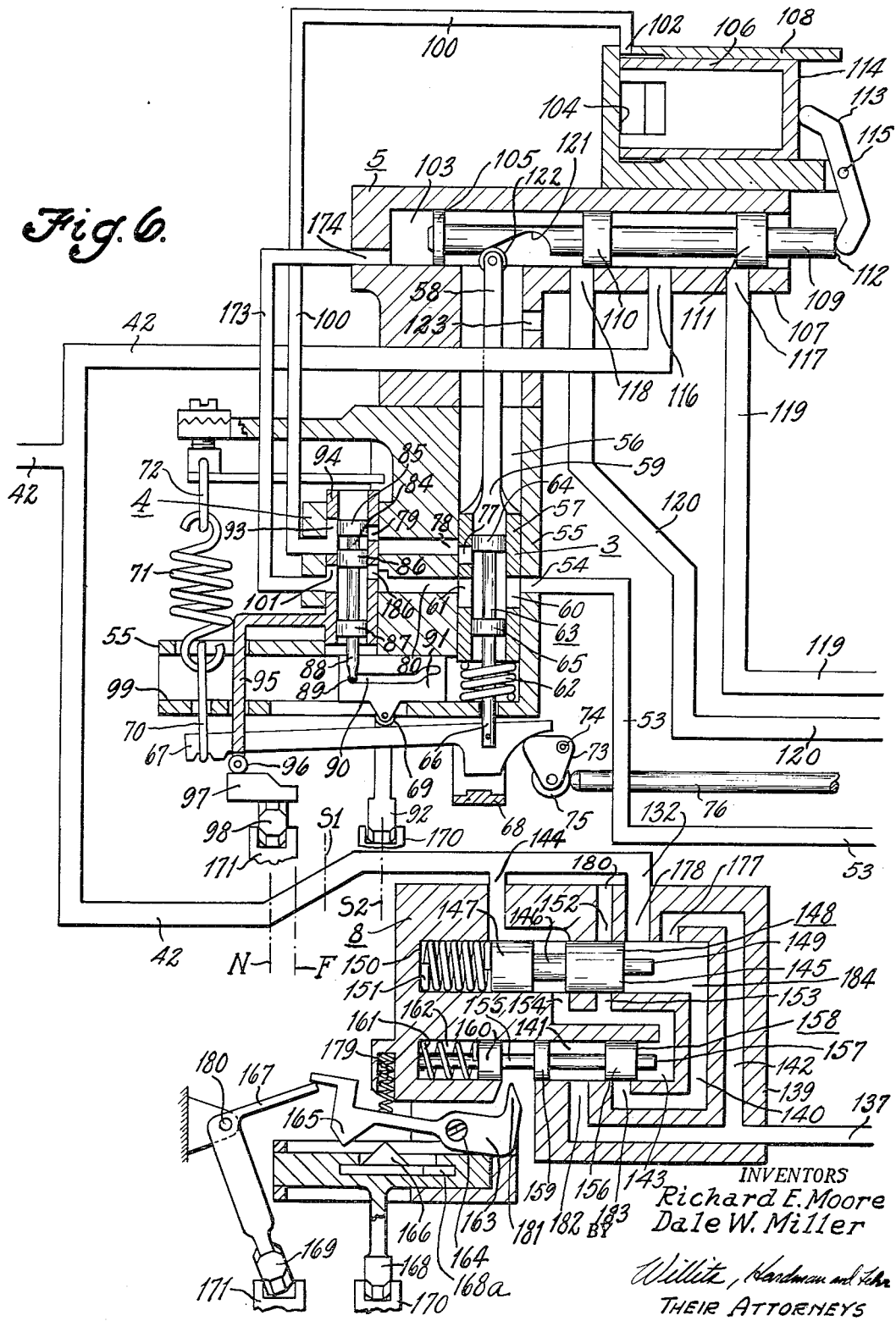
Fig. 6 is an enlarged fragmentary detail showing positions of the various valves in the negative pitch regime of operation.

The positions of the various control elements when negative pitch regime is desired are shown in Fig. 6. To obtain operation in the negative pitch regime, control ring 171 is moved to the right to the position N. In this position, cam follower 96 will be on the high portion of cam 97 and will, consequently, move sleeve valve 94 upwardly. When sleeve 94 is moved upwardly, it will close port 79 and expose port 93 to drain. Low pressure fluid from line 53 will still be constantly supplied by ports 54, 60, 61, passage 80, ports 186 and 101, line 173 and port 174 to the small servo chamber 103. As large servo chamber 104 is now connected to drain through port 102 to line 100 and port 93, the distributor valve 5 will move to the right and expose control port 117 to the high pressure port 116. Coincident with movement of the selector valve 94 upwardly, control ring 171 will pivot lug 167 by means of shoe 169 to move it upwardly so as to release latch 181 and allow the pilot valve 158 to move to the right so as to again condition the accumulator control valve assembly for operation. If the pressure of fluid in chamber 150, acting on the end surface of land 147 combined with the force of spring 151, is of less magnitude than the accumulator pressure in chamber 184, acting on end surface of land 145, the pressure responsive valve 148 will move to the left exposing port 178 to the accumulator pressure through port 177, closing off drain port 152. The pilot valve will be moved to the latched position under the urge of fluid pressure in chamber 143 which is connected by means of port 154 to passage 144, but is not latched since latch 181 is held in the retracted position. Under these conditions, fluid pressure from line 42 will be supplied through pressure port 116 and control port 117 to the decrease pitch chamber of the blade changing motor so as to move the blades to a negative pitch position. Movement of the blade 131 to a negative pitch position will actuate rod 76 through a mechanical linkage, and move cam 73 into engagement with lever 67 so as to position the plunger 63 to allow low pressure fluid to rapidly reposition the distributor valve when the governed positive regime is selected. After blade movement has stopped, the valve 148 will again be returned to the position shown in Fig. 1 of the drawings, under the urge of spring 151, to disconnect accumulator 138 and line 42.

Figure 7:
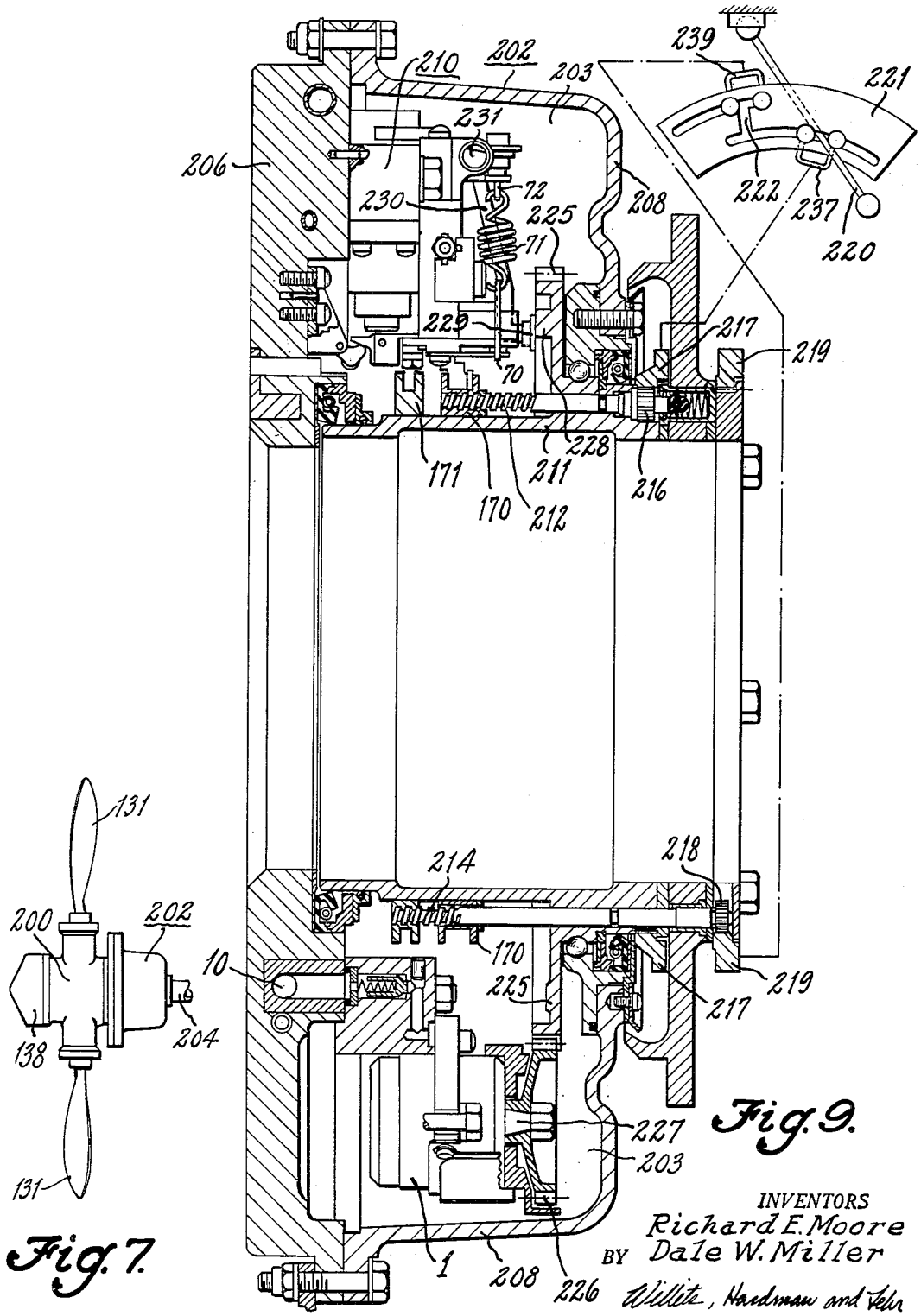
Fig. 7 is a perspective view of an aircraft propeller embodying the fluid pressure system of the present invention.
Figure 8:
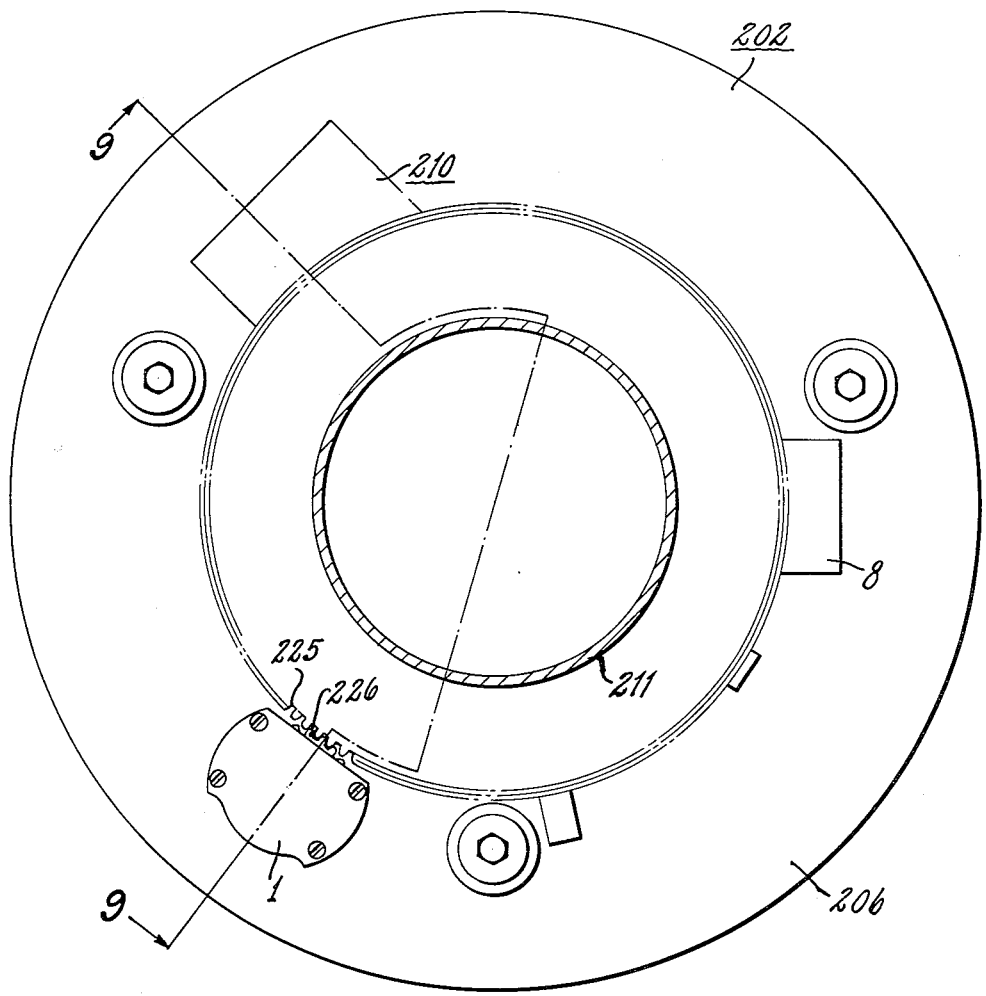
Fig. 8 is an elevational view of the propeller regulator with component parts of the fluid pressure system being shown in outline form.

Figs. 7 to 9 disclose an aircraft propeller embodying the fluid pressure system of the present invention. In Fig. 7 the blades 131 of the propeller are mounted in a hub 200 that has attached thereto the accumulator 138 at one end and a regulator 202 at the other end. The hub is driven by means of a shaft 204, and the regulator 202 is fastened to and rotates with the hub. The regulator 202 contains the fluid pressure system afore described. The regulator is generally of the type shown in the Blanchard et al. patents, previously referred to, as modified by the present invention.

Fig. 8 is an elevational view of the regulator with the cover removed, and Fig. 9 is a cross sectional view of the regulator shown in Fig. 8. A fluid pressure reservoir 203 is provided by a torus-shaped regulator casing comprising a front plate 206 which is rigidly attached to the propeller hub 200, a cup-shaped cover 208 rigidly secured to plate 206 and a stationary adapter sleeve 211. Suitable fluid seals and bearings are provided between the rotating cover and plate and the stationary sleeve. As is shown in Fig. 8 of the drawings, the front plate 206 of the regulator has mounted thereon component parts of the fluid system, shown in Fig. 1 of the drawings. An integral governor assembly unit 210, including the speed sensitive valve 3, the selector valve 4 and the servo actuator distributor valve 5, shown in Fig. 1, is mounted on plate 206. The feathering control valve 8, and the pump 1 are also mounted within the reservoir 203 on plate 206. The fluid connections between component parts of the fluid system are effected by passages within plate 206.

Referring more particularly to Fig. 9 of the drawings, the two control rings 170 and 171 circumscribe and are axially spaced along the adapter sleeve 211. Control ring 170 has a threaded engagement with high lead screw 212 and control ring 171 has a threaded engagement with high lead screw 214 that passes through an aperture in ring 170. Lead screw 212 has attached thereto at one end a pinion gear 216 which meshes with a circular rack or ring gear 217. Lead screw 214 has attached thereto at one end a pinion gear 218 which meshes with another circular rack or ring gear 219. The ring gears 217 and 219 are operatively connected by suitable mechanical linkage including yokes 237 and 239, respectively, to a control lever 220 in the aircraft cockpit. The control lever 220 has associated therewith a quadrant 221 within which the lever is movable. The quadrant is provided with a gate 222 through which the lever 220 must pass when blade movements from the governing regime to the negative regime or vice versa are selected. Thus, concurrent movement of both control rings is prevented. Movement of control lever 220 to the negative pitch regime will rotate ring gear 219 and lead screw 214 to cause control ring 171 to move to the right, axially of the adapter sleeve 210, as depicted in the drawings. Referring again to Fig. 1 of the drawings, movement of control ring 171 will cause a corresponding movement of the shoes 98 and 169 which ride in the control ring. When shoe 98 is moved to the right, the sleeve 94 of the selector valve assembly 4 is moved upwardly to condition the fluid circuit for propeller operation in the negative pitch regime. Coincident with movement of shoe 98 to the right, shoe 169 will trip the pilot valve of the feathering control valve assembly 8 to allow the pressure fluid in accumulator 138, or reserve supply, to be connected into the fluid system, if the system pressure is below a predetermined minimum. To effect blade movement from the negative pitch regime to the governed positive regime, the control lever (Fig. 9) 220 must be moved back through gate 222 of quadrant 221. Movement of the lever to the governed positive regime will cause rotation of lead screw 214 in the opposite direction and axial movement of control ring 171 to the left to a normal position. The control lever 220 may now be moved along the quadrant to select the desired speed. Movement of lever 220 to select a speed setting causes rotation of ring gear 217 and lead screw 212. Rotation of lead screw 212 effects axial movements of control ring 170 in opposite directions as determined by the direction of movement of lever 220. Referring again to Fig. 1, movement of control ring 170 between predetermined limits, S1 and S2 adjusts the position of fulcrum 69 by moving shoe 92 along lever 67 to select speed settings. Lever 61 has pivotally attached thereto the plunger 63 of the speed sensitive valve 3. The position of fulcrum 69 will determine the speed setting of the governor assembly. Movement of control ring 170 and its associated shoe 92 to the extreme left position beyond limit S1 for setting speed, as shown in Fig. 1, will cause cam follower 89 to ride upwardly in cam slot 90 of the carriage plate 91. As cam follower 89 is rigidly attached to the plunger 84 of the selector valve assembly 4, the plunger 84 will likewise be moved upwardly in equal amount. The uppermost position of the plunger of the selector valve assembly 4 will initiate movement of the blades 131 to the feathered regime. Coincident with movement of the plunger 84 upwardly, ring 170 will also move shoe 168 to a position where sliding cam 166 will have released the latch on the pilot valve of the feathering control valve assembly 8. Thus, when the fluid circuit is conditioned for operation in the feathered regime, the fluid pressure from the accumulator, or reserve supply of pressure fluid, is made available to the system if the system pressure is below a predetermined minimum.

The pump 1 attached to plate 206 is driven by relative rotation between fixed gear 225 which is integral with the adapter sleeve 211, and gear 226 which is attached to the pump drive shaft 227. Gear 225 has provided on one of its faces an undulated surface 228 which engages a plunger 229 movably attached to the governor valve assembly. Relative rotation between the undulated surface 228 of the gear 225 and the governor valve assembly will cause reciprocating movement of the plunger 229. Plunger 229 has attached thereto a lever 230 fastened to a rock shaft 231 mounted on the governor valve assembly unit. The reciprocating motion of the plunger 229 will oscillate shaft 231. Movement of shaft 231 is transmitted by suitable mechanical linkage, not shown, to the sleeve 57 of the speed sensitive valve 3. Thus, during rotation of the propeller and the regulator, the sleeve 57 will be oscillated about its axis to reduce static friction between the surface of the sleeve 57 and the chamber 56 of the speed sensitive valve. Movement of shaft 231 is also transmitted to member 72, by suitable linkage, not shown, to which is attached a spring 71 of the speed sensitive valve assembly. Thus, during propeller and regulator rotation, the spring load on lever 67 of the speed sensitive assembly will be constantly changing to likewise reduce static friction between the plunger 63 and the sleeve 57.

While the embodiment of the present invention as herein disclosed, constitutes a preferred form, it is to be understood that other forms might be adopted.

What is claimed is as follows:

1. In a fluid pressure system for controlling propeller blade pitch in governed speed and for moving the blades to feathering and negative pitch regimes, the combination including, a source of fluid pressure, passage means connected with said source of fluid pressure providing a high pressure line, pressure reducing means connected with the high pressure line and providing a low pressure line, a reversible blade shifting motor operable upon directed application of high pressure fluid to adjust the propeller blades, a servo-actuated distributor valve having a pressure port connected to said high pressure line and having a pair of control ports operatively connected to said motor for directing application of high pressure fluid to either side of said blade shifting motor, a speed sensitive valve having a pressure port connected to said low pressure line and having a control port operatively connected to and adapted to supply low pressure to and drain from said servo-actuated distributor valve for controlling the operation of said distributor valve in applying high pressure to either side of said blade adjusting motor, a selector valve assembly having a pressure port constantly open to the pressure port of said speed sensitive valve, a second and valve controlled port connectible to the control port of said speed sensitive valve, and a control port adapted to be selectively connected to either of said pressure ports and to drain for determining whether the blades will be operated in governed speed, feathering or negative pitch regimes, and passage means connecting said last mentioned control port with the servo-actuated distributor valve.

2. The combination set forth in claim 1, wherein said selector valve assembly includes a plunger valve for connecting said selector valve assembly control port to the selector valve assembly pressure port constantly open to the pressure port of said speed sensitive valve for moving the blades to a feathered position, and for connecting said selector valve assembly control port to the control port of said speed sensitive valve for blade operation in the governed speed regime.

3. The combination set forth in claim 1, wherein said selector valve assembly includes a sleeve valve for connecting said selector valve control port to drain for blade operation in the negative pitch regime.

4. A fluid pressure system for the control and adjustment of blade pitch of rotatable aircraft propellers in the governed positive, feathered and negative pitch regimes including, in combination; a source of fluid pressure, a fluid pressure motor operatively connected to said blades for adjusting the blades in either direction, means connected with said pressure source providing a high pressure line and a low pressure line, a distributor valve operatively connected to said high pressure line and said motor for directing said high pressure fluid to said motor, a speed sensitive valve assembly having a supply port connected to said low pressure line, fluid servo pistons and chambers operatively associated with said distributor valve having connections with said low pressure line for moving the distributor valve in opposite directions, a selector valve assembly including a sleeve having ports connected to and supplied with low pressure fluid from said speed sensitive valve assembly and a control port connected with one of said servo chambers for controlling the application of low pressure to and drain from said one servo chamber, said selector valve assembly also including a plunger having lands cooperable with said sleeve ports, means operable to move said plunger for predetermining propeller operation in the feathered regime, and means operable to move said sleeve for predetermining propeller operation in the negative pitch regime.

5. The combination as set forth in claim 4, wherein the servo chambers include pistons and cylinders of different areas operable on the distributor valve in opposing relation, passage means constantly connecting the smaller chamber to the low pressure line in all regimes of propeller operation, and means operable to meter the flow of low pressure fluid to said larger chamber when the speed sensitive valve assembly responds to an increase in propeller speed.

6. The combination, as set forth in claim 5, wherein the means for metering the flow of low pressure fluid to said larger chamber includes a control port and a cooperable land of said speed sensitive valve assembly.

7. The combination, as set forth in claim 4, wherein manual means are provided for moving the plunger of said selector valve assembly to accomplish propeller operation in the feathered regime, means including said selector valve assembly for nullifying any operational effect of the speed sensitive valve assembly during propeller operation in the feathered regime, and passage means including a part of said selector valve assembly for applying said low pressure directly to one of said servo chambers for shifting the distributor valve in an increase pitch direction for applying said high pressure to effect the feathered regime.

8. The combination, as set forth in claim 4, wherein manual means are provided for moving the sleeve of said selector valve assembly to accomplish propeller operation in the negative pitch regime, means including said selector valve assembly for by-passing said speed sensitive valve when the sleeve is moved to the negative pitch position, and passage means including a part of said selector valve assembly for applying said low pressure directly to one of said servo chambers for shifting the distributor valve in a decrease pitch direction for applying said high pressure to effect a negative pitch position.

9. A fluid pressure system for the control and adjustment of blade pitch of rotatable aircraft propellers in the feathered and negative pitch regimes including, in combination; a source of fluid pressure, passage means connected with said source of fluid pressure providing a high pressure line, pressure reducing means connected with the high pressure line and providing a low pressure line, pressure storing means selectively connectable to said high pressure line, a reversible blade shifting motor operable upon directed application of high pressure fluid thereto to adjust the propeller blades, a servo-actuated distributor valve having a pressure port connected to said high pressure line and having a pair of control ports operatively connected to said motor for directing application of said high pressure fluid to either side of said blade shifting motor, said servo-actuated distributor valve including servo cylinders and pistons, a selector valve assembly having a pressure port connected to and supplied with fluid from said low pressure line and a pair of ports connected to said servo cylinders, said selector valve including independently operable members for controlling the flow of said low pressure fluid to and from said servo cylinders, means for actuating said members for conditioning the distributor valve to initiate propeller operation in the feathered and negative pitch regimes and means coincidentally actuated by said last mentioned means for enabling said pressure storing means to be connected to said high pressure line during propeller operation in the feathered and negative pitch regimes.

10. The combination, as set forth in claim 9, wherein the means coincidentally actuated by said last mentioned means include a latched piston pilot valve, a bell crank for selectively latching and unlatching said valve piston, cam means for moving said bell crank to unlatch said valve piston in the feathered regime, and lug means for moving said bell crank to unlatch said valve piston in the negative pitch regime.

11. In a fluid system for controlling blade pitch in governed speed and for moving the blades to feathering and negative pitch regimes, the combination including; a source of fluid pressure, passage means connected with said source of fluid pressure providing a high pressure line, pressure reducing means connected with the high pressure line and providing a low pressure line, a reversible blade shifting motor operable upon directed application of high pressure fluid thereto to adjust the propeller blades, a servo-actuated distributor valve having a pressure port connected to said high pressure line and having a pair of control ports connected to said motor for directing application of high pressure fluid to either side of said blade shifting motor, a speed sensitive valve having a pressure port connected to said low pressure line and having a control port connected to said distributor valve and adapted to supply low pressure to and drain from said servo-actuated distributor valve for controlling the operation of said distributor valve in applying high pressure fluid to either side of said blade adjusting motor, a selector valve assembly including a pressure port constantly open to the pressure port of said speed sensitive valve, a second and valve-controlled port connectible to the control port of said speed sensitive valve, and a control port, means operable to connect said selector valve control port to said speed sensitive valve control port for propeller operation in the governed positive regime, means operable to connect said selector valve control port to said selector valve pressure port for moving the blades to the feathering regime, means operable to connect said selector valve control port to drain for propeller operation in the negative pitch regime, and passage means connecting said selector valve control port with the servo-actuated distributor valve.

12. Control means for a variable pitch propeller of the type having a plurality of blades and fluid motors for effecting movements of the blades in the governed positive, negative pitch and feathered regimes of operation including, in combination, a rotatable fluid pressure regulator, a source of fluid pressure including a system supply within said regulator, a pair of control valves within said regulator and operatively connected with said system supply and said motors for controlling the flow and fluid from said system supply to said fluid motors, said control valves being selectively adjustable to select a governed speed and to initiate operation in either the negative pitch or feathered regimes, one of said control valves having two relatively movable elements, means rotatable with said regulator for adjusting the other said control valves to select a governed speed, said last mentioned means including a part for adjusting one element of said one control valve to initiate operation in the feathered regime, a second means rotatable with said regulator for adjusting the other element of said one control valve to initiate operation in the negative pitch regime, a pair of non-rotatable control rings within said regulator and movable axially therein for actuating both of said adjusting means, and a manual control member outside of the propeller for moving said control rings independently of each other.

13. The combination set forth in claim 12 wherein said source of fluid pressure includes a reserve supply, a pilot valve for controlling the connection of said reserve supply to said system supply, and means operable by both of said adjusting means for coincidentally actuating said pilot valve when the relatively movable elements of said one control valve are adjusted to initiate operation in the negative pitch or feathered regimes.

14. Control means for a variable pitch propeller of the type having a plurality of blades and fluid motors for effecting movements of the blades in the governed positive, negative pitch, and feathered regimes of operation including, in combination, a propeller hub, a fluid pressure regulator rotatable with said hub, a source of fluid pressure within said regulator, a control mechanism mounted in said regulator and operatively connected with said source including a speed sensitive valve and a selector valve assembly having two relatively movable elements, a stationary sleeve projecting into said regulator about which the regulator rotates, a pair of control rings mounted on said sleeve and movable axially thereof, means operable upon axial movement of one of said rings between predetermined limits for adjusting said speed sensitive valve to select a governed speed, means operable upon movement of said one ring to a position beyond one of said limits for adjusting one element of the selector valve assembly to initiate operation in the feathered regime, means operable upon movement of the other of said control rings for adjusting the other element of said selector valve assembly for initiating propeller operation in the negative pitch regime, linkage means between each of the control rings and the outside of the propeller for selectively and independently moving either of the control rings, and means preventing concurrent movement of said control rings.

15. Control means for a variable pitch propeller of the type having a plurality of blades and fluid motors for effecting movements of the blades in the governed positive, negative pitch, and feathered regimes of operation including, in combination, a source of fluid pressure including system and reserve supplies, a fluid pressure regulator having a control mechanism operatively connected with said source including a speed sensitive valve, a selector valve assembly including two relatively movable elements, and a pilot valve, said speed sensitive valve and selector valve assembly having operative connection with said motors for controlling the application of fluid flow from the system supply to the fluid motors, said pilot valve controlling the connection of the reserve supply of fluid pressure to the system supply, said regulator providing a reservoir enclosing said control mechanism and including an adapter sleeve about which the regulator rotates, a pair of control rings movable axially of said adapter sleeve, one of said control rings being movable between predetermined limits to adjust only the speed sensitive valve and movable beyond one of said limits to adjust one element of the selector valve assembly, the other of said control rings being operable to adjust the other element of said selector valve assembly, means operatively connected with the control rings and the pilot valve for coincidentally actuating the pilot valve upon movement of said control rings to adjust the selector valve assembly elements, and linkage means between each of the control rings and the outside of the propeller for selectively and independently moving either of the control rings.

16. The combination set forth in claim 15 wherein the control rings are spaced axially along said adapter sleeve, and said linkage means between each of the control rings and the outside of the propeller includes circular rack and pinion combinations, a lever for oscillating said racks, and high lead screws secured to said pinions and having threaded engagement with the control rings for moving the control rings axially of said adapter sleeve upon oscillation of said racks by the lever.

17. The combination set forth in claim 15 wherein the control rings are spaced axially along and circumscribe said adapter sleeve, and said linkage means between each of the control rings and the outside of the propeller includes a first circular rack and pinion combination, a lever for oscillating said first rack, a high lead screw secured to said first pinion and having threaded engagement with one of said control rings, a second circular rack and pinion combination, said lever also being operable for oscillating said second rack, and a high lead screw secured to said second pinion and extending through said first control ring for threaded engagement with said second control ring.

18. A fluid pressure regulator for a variable pitch propeller having fluid pressure motors for adjusting blade pitch in the governed positive, negative pitch and feathered regimes of operation including, in combination, a torus-shaped housing having a stationary inner wall about which the outer and sidewalls rotate, a plurality of control valves mounted on one of said rotating walls, a source of fluid pressure within said housing having connection with said control valves, said valves having connection with said motors for controlling the application of fluid flow from said source of fluid pressure to said motors, a pair of control rings mounted on said stationary wall and movable axially thereof, means operatively associated with the valves and the control rings for adjusting said valves upon axial movement of said rings to select a governed speed and initiate operation in either the negative pitch or feathered regimes, means operatively connected to and operable to move one of said rings to select a governed speed and initiate operation in the feathered regime, means operatively connected to and operable to move the other of said rings to initiate operation in the negative pitch regime, and means forestalling movement of one of said rings while the other ring is being moved.

19. Control means for adjusting a blade of a variable pitch propeller subject to aerodynamic forces tending to shift the blade in a decrease pitch direction, including in combination, a source of fluid pressure, pressure regulating means operatively connected with said source, a reversely operable fluid motor operatively connected with said blade for adjusting the pitch thereof, a distributor valve operatively connected to the source and the motor for selectively applying regulated pressure to opposite sides of said fluid motor, said pressure regulating means including a valve element having opposed equal areas for controlling the potential of pressure applied to said motor, one of said areas being subjected to the pressure potential of said source, a shuttle valve connected between opposite sides of said motor and the other of said areas for subjecting the other of said areas to the greater of two pressure potentials existent in said fluid motor and a relief valve for reducing the pressure applied to said fluid motor when it is actuated to adjust the blade in the decrease pitch direction, said relief valve being closed when the distributor valve is actuated so as to apply regulated fluid pressure to the motor for adjusting the blade in an increase pitch direction whereby said fluid motor can demand the maximum pressure available from said fluid pressure source during pitch changing movements in the increase pitch direction.

20. Control means for adjusting a blade of a variable pitch propeller subject to aerodynamic forces tending to shift the blade in a decrease pitch direction, including in combination, a source of fluid pressure, pressure regulating means operatively connected with said source, a reversely operable fluid motor operatively connected with said blade for adjusting the pitch thereof, a distributor valve operatively connected to the source and the motor for selectively applying regulated pressure to opposite sides of said fluid motor, said pressure regulating means including a valve element having opposed equal areas for controlling the potential of pressure applied to said motor, one of said areas being subjected to the pressure potential of said source, a shuttle valve connected between opposite sides of said motor and the other of said areas for subjecting the other of said areas to the greater of two pressure potentials existent in said fluid motor and a relief valve for limiting the pressure applied to said fluid motor when it is actuated to adjust the blade in assisting relation to the aerodynamic forces, and fluid pressure means for maintaining said relief valve closed to subject the motor to the maximum pressure of said fluid pressure source when it is actuated to adjust the blade in opposing relation to the aerodynamic forces.

21. Control means for adjusting a blade of a variable pitch propeller subject to aerodynamic forces tending to shift the blade in a decrease pitch direction, including in combination, a source of fluid pressure, pressure regulating means operatively connected with said source, a reversely operable fluid motor operatively connected with said blade for adjusting the pitch thereof, a distributor valve operatively connected to the source and the motor for selectively applying regulated pressure to opposite sides of said fluid motor, said pressure regulating means including a valve element having opposed equal areas for controlling the potential of pressure applied to said motor, one of said areas being subjected to the pressure potential of said source, a shuttle valve connected between opposite sides of said motor and the other of said areas for subjecting the other of said areas to the greater of two pressure potentials existent in said fluid motor and a relief valve for limiting the available source pressure when the fluid motor is actuated to adjust the blade in a decrease pitch direction, and means for modifying the action of said relief valve in limiting the available source pressure when the fluid motor is actuated to move the blade in an increase pitch direction.

References Cited in the file of this patent

UNITED STATES PATENTS

| | | |
|---|---|---|
| 2,280,392 | Herman | Apr. 21, 1942 |
| 2,423,191 | Kopp | July 1, 1947 |
| 2,505,206 | Richardson et al. | Apr. 25, 1950 |
| 2,507,671 | May | May 16, 1950 |
| 2,513,660 | Martin et al. | July 4, 1950 |
| 2,550,529 | Carson | Apr. 24, 1951 |
| 2,617,389 | Munschauer | Nov. 11, 1952 |

FOREIGN PATENTS

| | | |
|---|---|---|
| 598,707 | Great Britain | Feb. 25, 1948 |